(12) United States Patent
Bradley, Jr. et al.

(10) Patent No.: US 6,236,510 B1
(45) Date of Patent: May 22, 2001

(54) COLOR SHIFTING THIN FILM PIGMENTS

(75) Inventors: Richard A. Bradley, Jr., Santa Rosa; Matthew R. Witzman, Rohnert Park, both of CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 09/518,007

(22) Filed: Mar. 2, 2000

Related U.S. Application Data

(62) Division of application No. 09/198,733, filed on Nov. 24, 1998.

(51) Int. Cl.[7] .................................................. G02B 1/10
(52) U.S. Cl. .................... 359/585; 359/589; 106/415; 428/403
(58) Field of Search ................................ 428/403, 404; 106/415; 359/578, 579, 585, 589, 580

(56) References Cited

U.S. PATENT DOCUMENTS

| | | | |
|---|---|---|---|
| 3,011,383 | 12/1961 | Sylvester et al. | 88/1 |
| 3,123,490 | 3/1964 | Bolomey et al. | 106/291 |
| 3,412,575 | 11/1968 | Feldman et al. | 63/2 |
| 3,622,473 | 11/1971 | Ohta et al. | 240/38 |
| 3,926,659 | 12/1975 | Horst et al. | 106/291 |
| 3,949,139 | 4/1976 | Dunning et al. | 428/328 |
| 3,962,397 | 6/1976 | Narui et al. | 264/144 |
| 3,988,494 | 10/1976 | McAdow | 428/328 |
| 4,010,293 | * 3/1977 | Davis | 427/214 |
| 4,116,710 | 9/1978 | Heikel | 106/290 |
| 4,213,886 | 7/1980 | Turner | 260/29.6 |

(List continued on next page.)

FOREIGN PATENT DOCUMENTS

| | | |
|---|---|---|
| 198 02 234 | 7/1998 | (DE) . |
| 472371 | 2/1992 | (EP) . |
| WO 96/22336 | 7/1996 | (WO) . |
| WO 96/38505 | 12/1996 | (WO) . |
| WO 98/12583 | 3/1998 | (WO) . |

OTHER PUBLICATIONS

Dobrowlski, et al., "Optical Interference Coatings for Inhibiting of Counterfeiting," Optica Acta, vol. 20, No. 12, pp. 925–937, 1973.

Greiwe, "Coloured Aluminum Pigments," Eckart–Werke, Werk Güntersthal, 4th Nürnberg Congress, Paper 6, 1–7 (1996).

The Mearl Corporation Brochure for Mearl Iridescent Film, Peekskill, New York.

\* cited by examiner

Primary Examiner—Cassandra Spyrou
Assistant Examiner—John Juba, Jr.
(74) Attorney, Agent, or Firm—Workman, Nydegger & Seeley

(57) ABSTRACT

A color shifting multilayer interference film is provided which may be used to produce flakes for use in colorants having color shifting properties. The flakes can be interspersed into liquid media such as paints or inks which can subsequently be applied to objects or papers to achieve color variations upon shifts in angle of incident light or upon shifts in viewing angle. A five layer design of the interference film includes a first absorber layer, a first dielectric layer on the first absorber layer, a reflector layer on the first dielectric layer, a second dielectric layer on the reflector layer, and a second absorber layer on the second dielectric layer. A three layer design of the interference film includes first and second absorber layers with a dielectric layer therebetween. The dielectric layers are formed to have an optical thickness at a design wavelength that provides a color shift as the angle of incident light or viewing changes.

20 Claims, 6 Drawing Sheets

U.S. PATENT DOCUMENTS

| | | | |
|---|---|---|---|
| 4,309,075 | 1/1982 | Apfel et al. | 350/164 |
| 4,321,087 | 3/1982 | Levine et al. | 75/0.5 |
| 4,434,010 | 2/1984 | Ash | 106/291 |
| 4,552,593 | 11/1985 | Ostertag | 106/291 |
| 4,629,512 | 12/1986 | Kondis | 106/290 |
| 4,705,300 | 11/1987 | Berning et al. | 283/91 |
| 4,705,356 | 11/1987 | Berning et al. | 350/166 |
| 4,721,217 | 1/1988 | Phillips et al. | 215/230 |
| 4,756,771 | 7/1988 | Brodalla et al. | 148/6.1 |
| 4,799,745 | 1/1989 | Meyer et al. | 350/1.7 |
| 4,838,648 | 6/1989 | Phillips et al. | 350/166 |
| 4,978,394 | 12/1990 | Ostertag et al. | 106/404 |
| 5,009,486 | 4/1991 | Dobrowolski et al. | 350/164 |
| 5,059,245 | 10/1991 | Phillips et al. | 106/22 |
| 5,084,351 | 1/1992 | Philips et al. | 428/411.1 |
| 5,116,664 | 5/1992 | Kimura et al. | 428/216 |
| 5,135,812 | 8/1992 | Phillips et al. | 428/403 |
| 5,171,363 | 12/1992 | Phillips et al. | 106/22 |
| 5,173,800 * | 12/1992 | King | 359/585 |
| 5,190,807 | 3/1993 | Kimock et al. | 428/216 |
| 5,198,042 | 3/1993 | Masumoto et al. | 148/403 |
| 5,214,530 * | 5/1993 | Coombs et al. | 359/589 |
| 5,278,590 | 1/1994 | Phillips et al. | 359/589 |
| 5,279,657 | 1/1994 | Phillips et al. | 106/22 |
| 5,332,767 | 7/1994 | Reisser et al. | 523/209 |
| 5,356,471 | 10/1994 | Reynders | 106/489 |
| 5,364,467 | 11/1994 | Schmid et al. | 106/404 |
| 5,378,527 | 1/1995 | Nakanishi et al. | 428/216 |
| 5,437,931 * | 8/1995 | Tsai et al. | 428/446 |
| 5,547,774 | 8/1996 | Miekka et al. | 156/209 |
| 5,549,953 * | 8/1996 | Li | 428/64.1 |
| 5,570,847 | 11/1996 | Phillips et al. | 241/23 |
| 5,571,624 | 11/1996 | Phillips et al. | 428/403 |
| 5,573,584 | 11/1996 | Ostertag et al. | 106/417 |
| 5,593,773 | 1/1997 | McKay et al. | 428/328 |
| 5,607,504 | 3/1997 | Schmid et al. | 106/403 |
| 5,624,076 | 4/1997 | Miekka et al. | 241/3 |
| 5,624,486 | 4/1997 | Schmid et al. | 106/404 |
| 5,629,068 | 5/1997 | Miekka et al. | 428/148 |
| 5,648,165 | 7/1997 | Phillips et al. | 428/346 |
| 5,672,410 | 9/1997 | Miekka et al. | 428/148 |
| 5,763,086 | 6/1998 | Schmid et al. | 428/404 |
| 5,766,334 | 6/1998 | Hashizume et al. | 106/403 |
| 5,766,335 | 6/1998 | Bujard et al. | 106/404 |
| 5,790,304 | 8/1998 | Sanders et al. | 359/361 |
| 5,830,567 | 11/1998 | Panush | 428/324 |
| 5,855,660 * | 1/1999 | Bujard et al. | 106/408 |
| 5,858,078 | 1/1999 | Andes et al. | 106/437 |
| 5,877,895 | 3/1995 | Shaw et al. | 359/588 |
| 6,013,370 | 1/2000 | Coulter et al. | 428/403 |
| 6,034,813 * | 3/2000 | Woodard et al. | 359/585 |
| 6,139,613 | 10/2000 | Hendrickson et al. | 106/415 |

COLOR SHIFTING THIN FILM PIGMENTS

This application is a divisional of U.S. application Ser. No. 09/198,733 filed on Nov. 24, 1998.

BACKGROUND OF THE INVENTION

1. The Field of the Invention

The present invention is related generally to thin film optical coatings for producing color. More specifically, the present invention is related to multilayer thin film interference coatings or flakes which exhibit color shifting properties with changes in angle of incident light or with viewing angle.

2. The Relevant Technology

Color shifting pigments and colorants have been used in numerous applications, ranging from automobile paints to anti-counterfeiting inks for security documents and currency. Such pigments and colorants exhibit the property of changing color upon variation of the angle of incident light, or as the viewing angle of the observer is shifted. The primary method used to achieve such color shifting colorants is to disperse small flakes, which are typically composed of multiple layers of thin films having particular optical characteristics, throughout a medium such as paint or ink that may then be subsequently applied to the surface of an object.

The color shifting properties of the colorant can be controlled through proper design of the optical coatings or films used to form the flakes. Desired effects can be achieved through the variation of parameters such as thickness of the layers forming the flakes and the index of refraction of each layer. The changes in perceived color which occur for different viewing angles or angles of incident light are a result of a combination of selective absorption of the materials comprising the layers and wavelength dependent interference effects. The absorption characteristics of a material are responsible for the basic color which is observed. The interference effects, which arise from the superposition of the light waves that have undergone multiple reflections and transmissions within the multilayered thin film structure, are responsible for the shifts in perceived color with different angles.

Thin film flakes having a preselected single color have been previously produced, such as disclosed in U.S. Pat. No. 4,434,010 to Ash, in which flakes composed of symmetrical layers may be used in applications such as automotive paints and the like. The flakes are formed by depositing a semi-opaque metal layer upon a flexible web, followed by a dielectric layer, a metal reflecting layer, another dielectric layer, and finally another semi-opaque metal layer. The thin film layers are specifically ordered in a symmetric fashion such that the same intended color is achieved regardless of whether the flakes have one or the other lateral face directed towards the incident radiation.

Examples of color shifting thin films are disclosed in U.S. Pat. No. 4,705,356 to Berning et al. In one embodiment therein, a three layer metal(1)-dielectric-metal(2) stack is disclosed in which metal(1) is a relatively thin, highly absorptive material, metal(2) is a highly reflecting, essentially opaque metal, and the dielectric is a low index of refraction material. In an alternative embodiment, an all-dielectric stack is disclosed. These designs, however, require the use of so-called subtractive colorant carrying superstrates which utilize dyes to achieve the desired colors. Further, the high numbers of layers used in all-dielectric stacks are known to suffer from mechanical stresses, which in turn are extremely detrimental to color characteristics, since nonuniform surfaces will themselves cause destructive interference effects which will effectively "wash out" the intended colors.

Further improvements in the optical characteristics of thin film flakes which may be used in paints and inks such as for anti-counterfeiting applications are disclosed in U.S. Pat. No. 5,135,812 to Phillips et al. According to this patent, a symmetrical optical multilayer film is composed either of transparent all-dielectric stacks, or transparent dielectric and semi-transparent metallic layered stacks. In the case of an all-dielectric stack, the optical coating is made of alternating layers of high and low index of refraction materials. Suitable materials disclosed are zinc sulfide or titanium dioxide for the high index layers, and magnesium fluoride or silicon dioxide for the low index layers.

In U.S. Pat. No. 5,278,590 to Phillips et al., a symmetric three layer optical interference coating is disclosed which comprises first and second partially transmitting absorber layers which have essentially the same composition and thickness, and a dielectric spacer layer located between the first and second absorber layers. The dielectric layer is composed of a material having a low index of refraction such as magnesium fluoride.

High chroma interference platelets for use in paints, including color shifting and nonshifting single color platelets, are disclosed in U.S. Pat. No. 5,571,624 to Phillips et al. These platelets are formed from a symmetrical multi-layer thin film structure in which a first semi-opaque layer such as chromium is formed on a substrate, with a first dielectric layer formed on the first semi-opaque layer. An opaque reflecting metal layer such as aluminum is formed on the first dielectric layer, followed by a second dielectric layer of the same material and thickness as the first dielectric layer. A second semi-opaque layer of the same material and thickness as the first semi-opaque layer is formed on the second dielectric layer. For the color shifting designs, the dielectric materials utilized have an index of refraction less than 2.0, such as magnesium fluoride. For the nonshifting designs, the dielectric materials are selected to have an index of refraction greater than 2.0, such as titanium dioxide or zinc sulfide.

SUMMARY AND OBJECTS OF THE INVENTION

It is a primary object of the invention to provide color shifting flakes which have a wide range of color shifting properties.

A further object of the invention is to provide color shifting flakes which have substantial shifts in chroma and hue with a varying angle of view.

It is yet another object of the invention to provide color shifting flakes which may be easily and economically utilized in colorants such as paints and inks for various applications.

To achieve the forgoing objects and in accordance with the invention as embodied and broadly described herein, a color shifting multilayer interference film is provided which may be used to produce flakes for pigments having color shifting properties. The flakes can be interspersed into liquid media such as paints or inks which can subsequently be applied to objects or papers to achieve color variations upon shifts in angle of incident light or upon shifts in viewing angle.

In one embodiment of the invention, a five layer design of the interference film includes a first absorber layer, a first dielectric layer on the first absorber layer, a reflector layer on the first dielectric layer, a second dielectric layer on the reflector layer, and a second absorber layer on the second dielectric layer. The first and second absorber layers are preferably composed of the same materials, and the first and second dielectric layers are preferably composed of the same materials. The first and second dielectric layers have an index of refraction of greater than about 1.65 and an optical thickness at a design wavelength that provides a color shift as the angle of incident light or viewing changes.

In another embodiment, a three layer design of the interference film includes a first absorber layer, a dielectric layer on the first absorber layer, and a second absorber layer on the dielectric layer. The first and second absorber layers are preferably composed of the same materials. The dielectric layer has an index of refraction of greater than about 1.65 and an optical thickness at a design wavelength that provides a color shift as the angle of incident light or viewing changes.

In a method of fabricating a color shifting multilayer interference film according to the present invention, a web material with a release layer formed on an upper surface is utilized. The various absorber, dielectric, and reflector layers as described above are formed on the web material by conventional deposition processes to produce a particular film design. The film is then removed from the web material in the form of flakes. The flakes can then be dispersed in a polymeric medium to produce a color shifting colorant such as a color shifting paint or ink.

These and other aspects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION OF THE INVENTION

The present invention is directed to multilayer interference films which may be used to produce flakes having color shifting properties. The flakes can be interspersed into liquid media such as paints or inks which can subsequently be applied to objects or papers to achieve color variations upon shifts in angle of incident light or upon shifts in viewing angle by an observer.

The color shifting flakes of the invention are formed from a symmetrical multilayer thin film coating structure. The thin film coatings described herein are typically made by methods well known in the art of forming thin coating structures, such as physical vapor deposition (PVD). As discussed in greater detail below, the coating structure is formed on a flexible web material and is removed therefrom as thin film flakes, which can be added to a liquid medium such as various pigment vehicles for use as a colorant with color shifting properties. A collection of such thin film flakes added to a liquid medium produces a predetermined optical response through radiation incident on a surface of the solidified medium.

Figure 1:
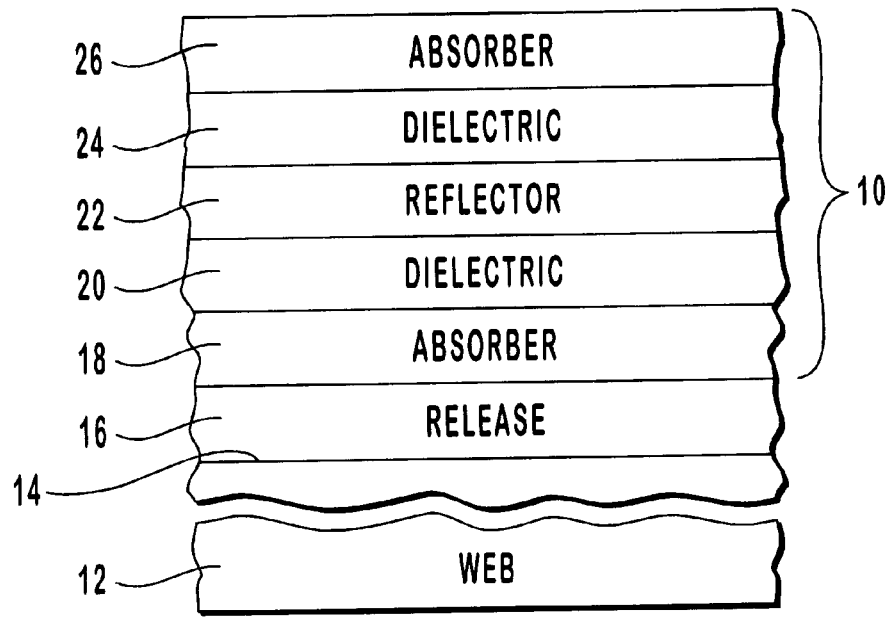
FIG. 1 is a schematic depiction of a color shifting multilayer interference film according to one embodiment of the present invention.

Referring to the drawings, wherein like structures are provided with like reference designations, FIG. 1 depicts one embodiment of a multilayer thin film interference coating design having color shifting characteristics in the form of an interference film 10. The interference film 10 is formed on a web 12 of a flexible material such as a polyester material (e.g., polyethylene terephthalate). The web 12 has an upper surface 14 and can be employed in a conventional roll coater apparatus. A release layer 16 of a suitable type is formed on upper surface 14 of web 12, allowing interference film 10 to be removed as thin flakes. The release layer 16 may be an organic solvent soluble or water soluble coating such as acrylic resins, cellulosic propionates, (polyvinyl pyrrolidine) polyvinyl alcohol or acetate, and the like.

A first absorber layer 18 of interference film 10 is deposited on release layer 16 by a conventional deposition process such as PVD. The absorber layer 18 is formed to have a suitable thickness of about 50–150 Angstroms (Å), and preferably a thickness of about 70–90 Å. The absorber layer 18 can be composed of a semi-opaque material such as a grey metal, including metals such as chromium, nickel, titanium, vanadium, cobalt, and palladium, as well as other metals such as iron, tungsten, molybdenum, niobium, aluminum, and the like. Various combinations and alloys of the above metals may also be utilized, such as Inconel (Ni—Cr—Fe). Other absorber materials may also be employed in absorber layer 18 such as carbon, germanium, cermet, ferric oxide or other metal oxides, metals mixed in a dielectric matrix, and the like.

A first dielectric layer 20 is then formed on absorber layer 18 by a conventional deposition process. The dielectric layer 20 is formed to have an effective optical thickness for imparting color shifting properties to interference film 10. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) which is equal to 4 $\eta d/\lambda$, where $\lambda$ is the wavelength at which a QWOT condition occurs. The optical thickness of dielectric layer 20 can range from about 2 QWOT at a design wavelength of about 400 nm to about 9 QWOT at a design wavelength of about 700 nm, depending upon the color desired. Suitable materials for the dielectric layer include those having an index of refraction of greater than about 1.65, and preferably about 2 or greater.

Examples of suitable materials for the dielectric layer include zinc sulfide, zirconium oxide, tantalum oxide, silicon monoxide, cerium oxide, hafnium oxide, titanium oxide, praseodymium oxide, yttrium oxide, combinations thereof, and the like. Table 1 below lists the above dielectric materials with their respective refractive indices.

TABLE 1

| Dielectric Material | Formula | Refractive Index |
|---|---|---|
| zinc sulfide | ZnS | 2.2 |
| zirconium oxide | $ZrO_2$ | 2.0 |
| tantalum oxide | $Ta_2O_5$ | 2.1 |
| silicon monoxide | SiO | 1.6–1.9 |
| cerium oxide | CeO | 1.95 |
| hafnium oxide | $HfO_2$ | 2.0 |
| titanium oxide | $TiO_2$ | 2.0 |
| praseodymium oxide | $Pr_2O_3$ | 1.8 |
| yttrium oxide | $Y_2O_3$ | 1.8 |

A reflector layer 22 is formed on dielectric layer 20 by a conventional deposition process. The reflector layer 22 is formed to have a suitable thickness of about 500–1000 Å, and preferably a thickness of about 700–900 Å. The reflector layer 22 is preferably composed of an opaque, highly reflective metal such as aluminum, silver, copper, gold, platinum, niobium, tin, combinations and alloys thereof, and the like, depending on the color effects desired. It should be appreciated that semi-opaque metals such as grey metals become opaque at approximately 350–400 Å. Thus, metals such as chromium, nickel, titanium, vanadium, cobalt, and palladium, could also be used at an appropriate thickness for reflector layer 22.

A second dielectric layer 24 is then formed on reflector layer 22 by a conventional deposition process. The second dielectric layer 24 is preferably formed of the same material and has the same thickness as first dielectric layer 20 described above. For instance, dielectric layer 24 can be formed of zinc sulfide or other suitable dielectric material having a refractive index of greater than about 1.65 at a suitable optical thickness as described above.

Lastly, a second absorber layer 26 is deposited on second dielectric layer 24 by a conventional deposition process. The second absorber layer 26 is preferably formed of the same material and has the same thickness as first absorber layer 18. For example, absorber layer 26 can be formed of a grey metal such as chromium or other absorber material at a suitable thickness as described above.

The formed interference film 10 shown in FIG. 1 is a five-layer design having a symmetrical multilayer structure on opposing sides of the reflector layer, which provides the maximum optical effects from flakes made from film 10.

It should be appreciated that if desired, flakes can be formed which are non-symmetrical. For example, the flakes can omit the dielectric layer and the absorber layer from one side of the reflector layer, or different dielectric thicknesses on either side of the reflector layer may be utilized. When two sides have asymmetry with respect to the dielectric layer thickness, the flakes would have different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

Figure 2:
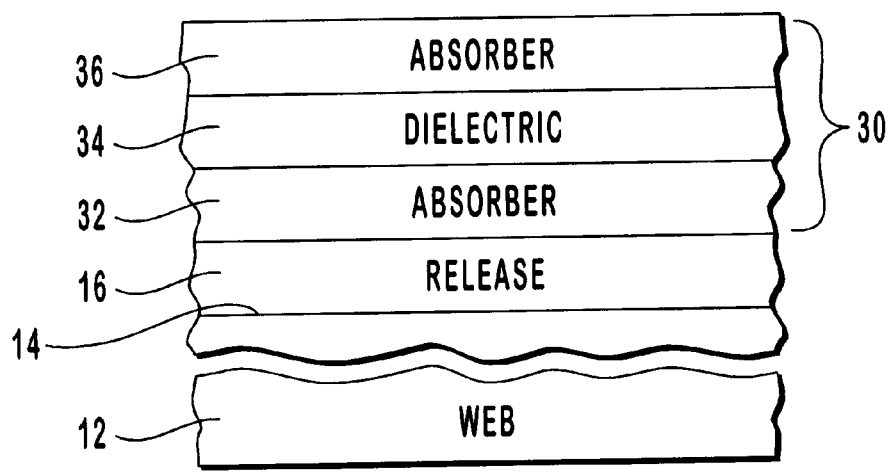
FIG. 2 is a schematic depiction of a color shifting multilayer interference film according to another embodiment of the present invention.

FIG. 2 depicts another embodiment of a multilayer thin film interference coating having color shifting characteristics in the form of an interference film 30. The interference film 30 is a three-layer design and is formed on a web 12 of a flexible material having an upper surface 14. A release layer 16 is formed on upper surface 14 of web 12, allowing interference film 30 to be removed as thin flakes.

A first absorber layer 32 of interference film 30 is deposited on release layer 16 a conventional deposition process such as PVD. The absorber layer 32 is formed to have a suitable thickness of about 50–150 Å, and preferably a thickness of about 70–90 Å. The absorber layer 32 can be composed of a semi-opaque material such as a grey metal, metal oxide, or other absorber material, such as those discussed above for film 10.

A dielectric layer 34 is formed on absorber layer 32 by a conventional deposition process. The dielectric layer 34 is formed to have an effective optical thickness for imparting a color shifting feature to interference film 30. For example, the optical thickness of dielectric layer 34 can range from about a 2 QWOT at a design wavelength of about 400 nm to about a 9 QWOT at a design wavelength of about 700 nm. Suitable materials for the dielectric layer include those having an index of refraction of greater than about 1.65, and preferably about 2 or greater. Examples of such materials for the dielectric layer include zinc sulfide, zirconium oxide, or other dielectric materials such as those discussed above for film 10.

A second absorber layer 36 is deposited on dielectric layer 34 by a conventional deposition process to complete the structure of interference film 30. The second absorber layer 36 is preferably formed of the same material and has the same thickness as first absorber layer 32. The formed interference film 30 thus has a symmetrical three-layer design.

After a multilayer interference film of the type shown in FIGS. 1 or 2 has been formed on web 12, the interference film can be removed from web 12 by use of a solvent to form flakes or platelets which are sized to have a dimension on any surface thereof ranging from about 2 to about 200 microns. The flakes can be further reduced in size as desired. For example, the flakes can be subjected to an air grind to reduce their size to about 2–5 microns without destroying their desirable color characteristics.

The flakes of the invention are characterized by being comprised of a symmetrical multilayer thin film interference structure in which the layers lie in parallel planes such that the flakes have first and second parallel planar outer surfaces and an edge thickness perpendicular to the first and second parallel planar outer surfaces. The flakes are produced to have an aspect ratio of at least about 2:1, and preferably about 5–10:1 with a narrow particle size distribution. The aspect ratio of the flakes is ascertained by taking the ratio of the longest planar dimension of the first and second outer surfaces to the edge thickness dimension of the flakes.

In order to impart additional durability to the color shifting flakes, it has been found that it is desirable to anneal or heat treat the flakes at a temperature ranging from about 200–300° C., and preferably from about 250–275° C., for a time period ranging from about 10 minutes to about 24 hours, and preferably a time period of about 15–30 minutes.

After the color shifting flakes have been sized, they can be blended with other flakes to achieve the color required by adding flakes of different hues, chroma and brightness to achieve a desired result. The color shifting flakes can then be dispersed into a polymeric medium such as a paint, ink, or other polymeric pigment vehicle for use in a conventional manner. At the same time, additives of other types can be mixed with the pigment vehicle to achieve the final desired effects. These additives include lamellar pigments such as aluminum flakes, graphite, carbon aluminum flakes, mica flakes, and the like, as well as non-lamellar pigments such as aluminum powder, carbon black, and other organic and inorganic pigments such as titanium dioxide, and the like. After this has been accomplished, a high chroma durable paint or ink is ready for use.

The color shifting flakes of the invention can also can also be combined with non-shifting high chroma platelets to produce unique color effects. In addition, the color shifting flakes can be combined with highly reflective platelets such as $MgF_2$/aluminum/$MgF_2$ platelets to produce additional color effects.

By using an absorber/dielectric design such as shown in FIGS. 1 and 2, high chroma durable paint or ink can be achieved in which variable color effects are noticeable to the human eye. Thus, an object colored with a paint containing the color shifting flakes of the invention will change color depending upon variations in the viewing angle or the angle of the object relative to the viewing eye. By way of example, colors which can be achieved utilizing the interference flakes according to the invention can have color shifts such as gold-to-green, green-to-magenta, blue-to-red, green-to-silver, magenta-to-silver, etc.

The color shifting flakes of the present invention are particularly suited for use in applications where colorants of high chroma and durability are desired. The color characteristics of the colorant are achieved by utilizing a collection of thin film flakes of high chroma which produce predetermined optical responses to radiation incident on the surface of the flakes. The color shifting flakes of the invention have a wide range of color shifting properties, including large shifts in chroma (degree of color purity) and also large shifts in hue (relative color) with a varying angle of view.

The color shifting flakes of the invention can be easily and economically utilized in colorants such as paints and inks for various applications. Colorants which employ the color shifting flakes can be applied to many different objects and papers. Examples of such objects and papers include motorized vehicles, currency and security documents, household appliances, architectural structures, flooring, fabrics, electronic packaging/housing, toys, etc.

EXAMPLES

In order to quantify the perceived color of a particular object, it is useful to invoke the XYZ tristimulus color coordinate system developed by the Commission Internationale de l'Elclairage (CIE), which is now used as a standard in the industry in order to precisely describe color values. In this system, colors can be related completely and accurately through the variables X, Y, and Z, which are determined mathematically as the integrals of three distribution functions covering the visible spectrum, which ranges from about 380 nm to about 770 nm, with the reflectance or transmittance curve and the energy distribution of the light source. The variables x, y, and z, which are normalized values of X, Y, and Z, respectively, are known in the art as the chromaticity coordinates, and are routinely used in the industry to quantify aspects of color such as purity, hue, and brightness.

Another color coordinate system developed by CIE defines color characteristics which account for the dependence of color sensitivity of the eye on viewing angle in terms of $X_{10}Y_{10}Z_{10}$ tristimulus values. These values may be used for viewing angles greater than 4° (and are exact for a viewing angle of 10°), while the values X, Y, and Z are reserved for viewing angles specified for a 4° angle or less.

The parameters X, Y, and Z are defined by the following equations:

$$X=K\int S(\lambda)x'(\lambda)R(\lambda)d\lambda$$

$$Y=K\int S(\lambda)y'(\lambda)R(\lambda)d\lambda$$

$$Z=K\int S(\lambda)z'(\lambda)R(\lambda)d\lambda$$

where $$K = \frac{100}{\int S(\lambda)y'(\lambda)d\lambda}$$

$S(\lambda)$ is the relative spectral power distribution of the illuminant;

$x'(\lambda)$, $y'(\lambda)$, and $z'(\lambda)$ are the color matching functions for a specified angle; and $R(\lambda)$ is the spectral reflectance of the specimen.

The chromaticity coordinates, x, y, and z can be calculated from the X, Y, Z tristimulus values through the following formulae:

$$x=X/(X+Y+Z)$$

$$y=Y/(X+Y+Z)$$

$$z=Z/(X+Y+Z)=1-x-y.$$

From the x, y, z chromaticity coordinates, a useful diagram known as the "chromaticity diagram" can be plotted, wherein the loci of x and y values correspond to all real colors; which in conjunction with the human eye response function and the third dimension of brightness (which may be conveniently plotted on an axis perpendicular to the chromaticity plane), can be used to completely describe all aspects of perceived color. This system of color description is particularly useful when a quantitative comparison of color attributes is required.

The chromaticity plane may be described in a variety of ways; however, a standard in the industry is known as the L*a*b* color space defined by CIE. In this color space, L* indicates lightness and a* and b* are the chromaticity coordinates. In an L*a*b* chromaticity diagram, the a* axis is perpendicular to the b* axis, with increasingly positive values of a* signifying deepening chroma of red and increasingly negative values of a* signify deepening chroma of green. Along the b* axis, increasingly positive values of b* signify deepening chroma of yellow, whereas increasingly negative values of b* indicate deepening chroma of blue. The L* axis indicating lightness is perpendicular to the plane of the a* and b* axes. The L* axis along with the a* and b* axes provide for a complete description of the color attributes of an object.

The L*a*b* color system allows for a comparison of the color differences between two measurements through one number, namely delta $E_{ab}$ ($\Delta E_{ab}$), which indicates the change in color as measured in the L*a*b* color space. The numerical value for $\Delta E_{ab}$ is calculated through the following equation using the measured L*a*b* values:

$$\Delta E_{ab}=[(\Delta L^*)^2+(\Delta a^*)^2+(\Delta b^*)^2]^{1/2}$$

where the symbol Δ denotes a difference in measurements taken at two different angles (e.g., 0 degrees incidence and 45 degrees incidence).

The following examples are given to illustrate the present invention, and are not intended to limit the scope of the invention. The examples utilize the L*a*b* color space as described above in order to evaluate the color shifting properties of fabricated interference films useful as pigments.

Example 1

A color shifting interference film having a five layer design was fabricated according to the present invention by depositing an absorber layer composed of chromium 75 Å thick on a web, followed by a first dielectric layer composed of zinc sulfide having a 5 QWOT at 535 nm. Upon the first dielectric layer was deposited a highly reflective layer of aluminum 800 Å thick, followed by a second dielectric layer of zinc sulfide having a 5 QWOT at 535 nm. Lastly, another absorber layer of chromium 75 Å thick was deposited on the second dielectric layer and the formed film was removed from the web. The zinc sulfide used in this particular design had a refractive index of about 2.2, and the number of the quarter wave optical thickness for the zinc sulfide was optimized for a design wavelength of 535 nm. The formed film had gold-to-green color shifting properties.

Table 2 below lists the values for the measured L*a*b* coordinates and $\Delta E_{ab}$ for the gold-to-green film design of Example 1.

TABLE 2

Gold-to-Green Film Design

|  | Incidence Angle | |
|---|---|---|
|  | 95° | 145° |
| L* | 159.9 | 197.2 |
| a* | 18.8 | −50.8 |
| b* | 67.78 | 82.77 |
| $\Delta E_{ab}$ | 80.38 | — |

Figure 3:
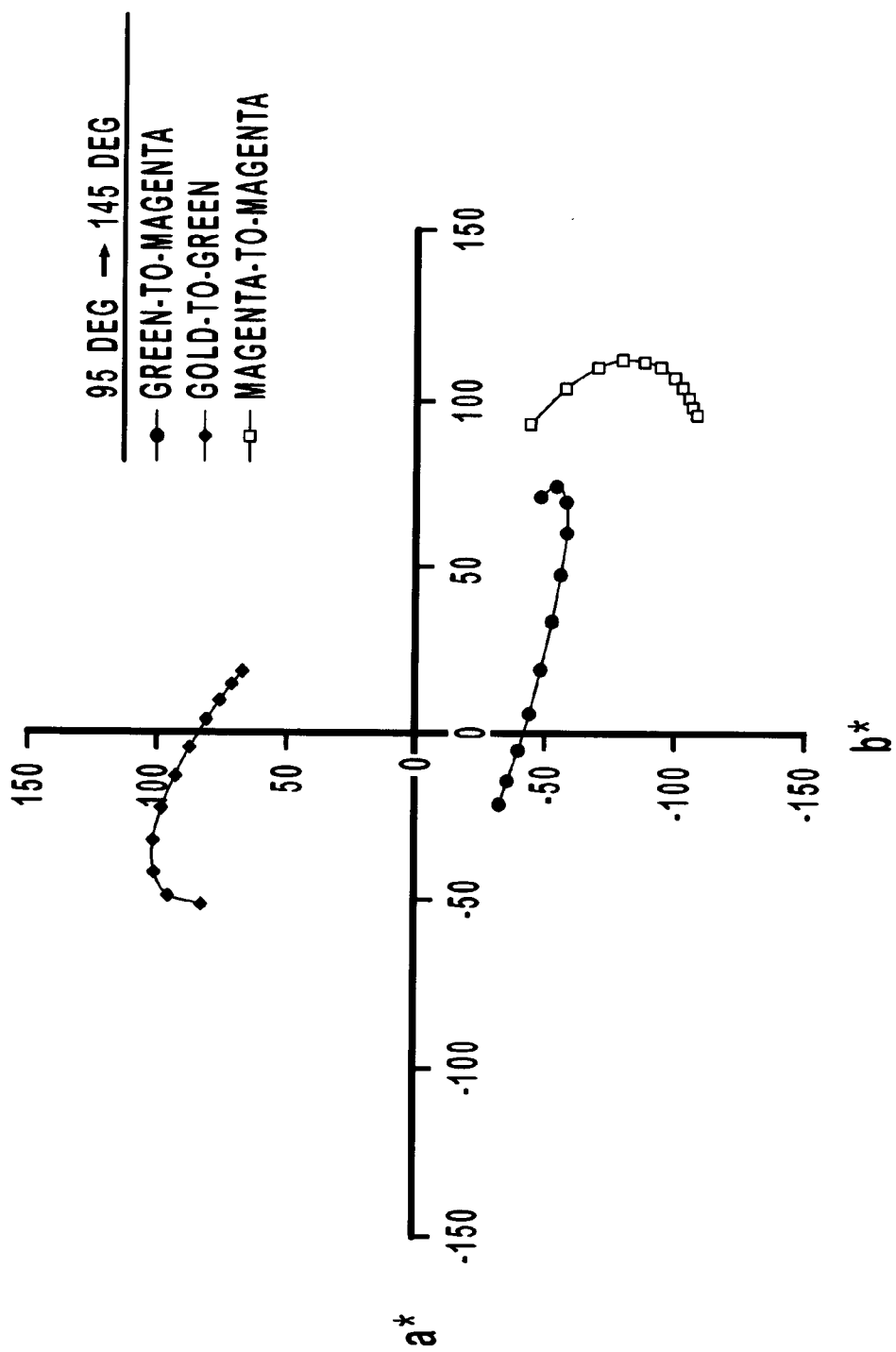
FIG. 3 is a graph of the measured color travel for various color shifting multilayer interference films of the present invention containing zinc sulfide.

The measured color travel for the gold-to-green film design is plotted in the graph of FIG. 3, in which the vector (arrow) represents the change in chroma and hue as the viewing angle changes from 95 degrees to 145 degrees. As indicated in FIG. 3, a significant color shift is achieved with the five layer design of Example 1.

Example 2

A color shifting interference film having a five layer design similar to the interference film of Example 1 was fabricated according to the present invention. An absorber layer of chromium 75 Å thick was deposited on a web, followed by a first dielectric layer of zinc sulfide having a 6 QWOT at 555 nm. Upon the first dielectric layer was deposited a highly reflective layer of aluminum 800 Å thick, followed by a second dielectric layer of zinc sulfide having a 6 QWOT at 555 nm. Lastly, another absorber layer of chromium 75 Å thick was deposited on the second dielectric layer. The formed film had green-to-magenta color shifting properties.

Table 3 below lists the values for the measured L*a*b* coordinates and $\Delta E_{ab}$ for the green-to-magenta film design of Example 2.

TABLE 3

Green-to-Magenta Film Design

|  | Incidence Angle | |
|---|---|---|
|  | 95° | 145° |
| L* | 125.2 | 163.7 |
| a* | −20.9 | 71.8 |
| b* | −33.2 | −48.1 |
| $\Delta E_{ab}$ | 101.47 | — |

The measured color travel for the green-to-magenta film design is plotted in the graph of FIG. 3, in which the vector (arrow) represents the change in chroma and hue as the viewing angle changes from 95 degrees to 145 degrees. As indicated in FIG. 3, a significant color shift is achieved with the five layer design of Example 2.

Example 3

A nonshifting color interference film having a five layer design was fabricated as a comparative example. An absorber layer of chromium 75 Å thick was deposited on a web, followed by a first dielectric layer of zinc sulfide having a 4 QWOT at 506 nm. Upon the first dielectric layer was deposited a highly reflective layer of aluminum 800 Å thick, followed by a second dielectric layer of zinc sulfide having a 4 QWOT at 506 nm. Lastly, another absorber layer of chromium 75 Å thick was deposited on the second dielectric layer. The formed interference film had nonshifting magenta-to-magenta color properties.

Table 4 below lists the values for the measured L*a*b* coordinates and $\Delta E_{ab}$ for the magenta film design of Example 3.

TABLE 4

Nonshifting Magenta Film Design

|  | Incidence Angle | |
|---|---|---|
|  | 95° | 145° |
| L* | 105.7 | 160.3 |
| a* | 97.1 | 94.2 |
| b* | −108.7 | −44.95 |
| $\Delta E_{ab}$ | 84 | — |

The measured color travel for the magenta film design is plotted in the graph of FIG. 3, in which the vector (arrow) represents the change in chroma and hue as the viewing angle changes from 95 degrees to 145 degrees. As indicated in FIG. 3, while there is a slight color travel, there is no crossing of an a* or b* axis of the graph and thus no significant color shift occurs in the five layer design of Example 3.

Thus, comparing the film design of Example 3 with those of Examples 1 and 2 shows that a slight variation in the optical thickness of the dielectric layer can result in an interference film with a significant color shift (Examples 1 and 2) or no significant color shift (Example 3) even when using the same material for the dielectric layer.

Example 4

Figure 4:
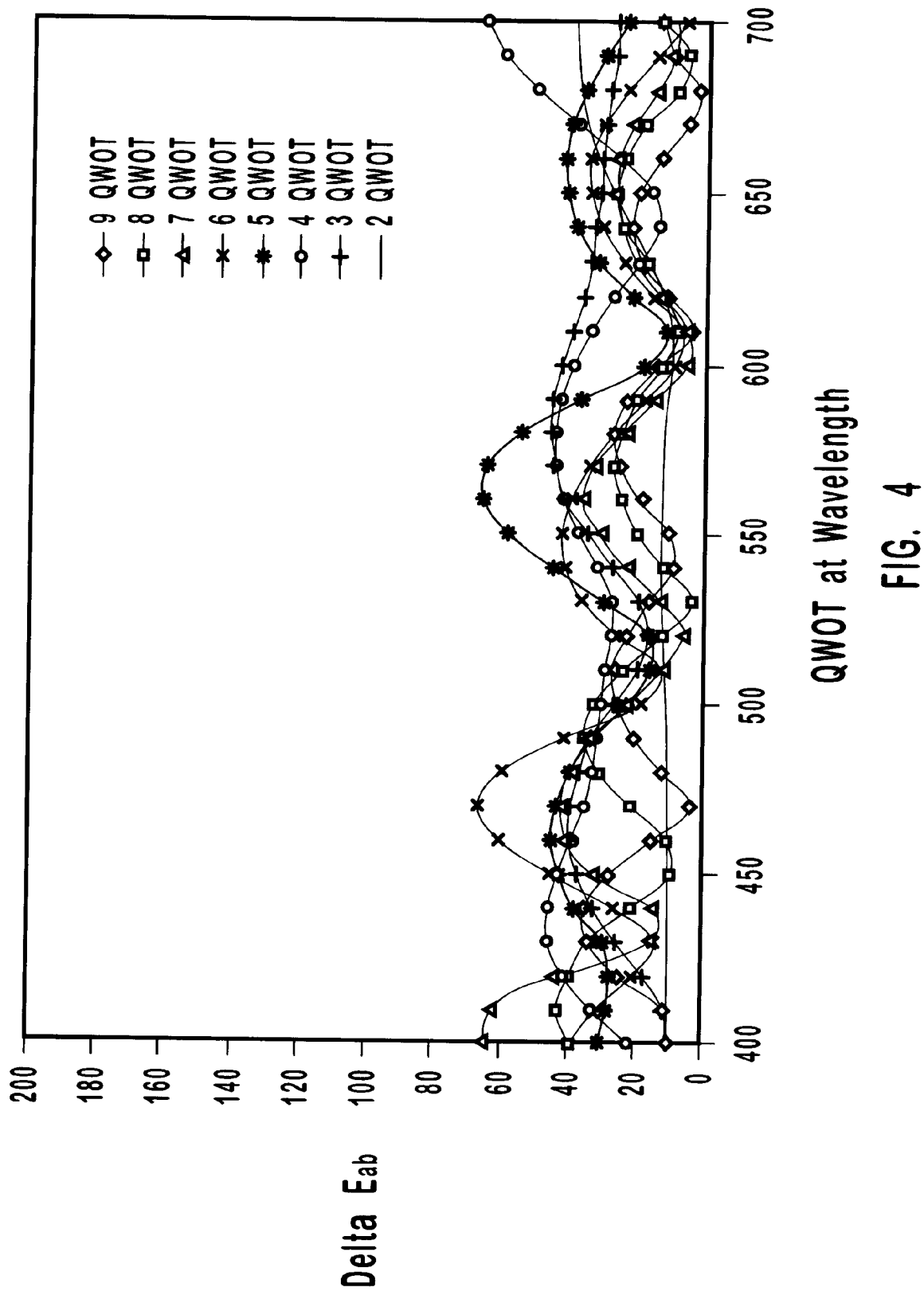
FIG. 4 is a graph showing the calculated values of delta $E_{ab}$ which were obtained for various color shifting multilayer interference films of the present invention at various wavelengths in the visible spectral range.

Theoretical modeling was performed for zinc sulfide based interference film designs according to the present invention, in order to determine $\Delta E_{ab}$ values for a range of dielectric layer optical thicknesses. FIG. 4 is a graph showing the calculated values of $\Delta E_{ab}$ which were obtained for the zinc sulfide designs for integer multiples of quarter wave optical thicknesses in the range from 2 to 9 at various wavelengths in the visible spectral range.

Example 5

Various color shifting interference film samples having a five layer design similar to the interference film of Example 1 were fabricated according to the present invention. Each sample contained dielectric layers of zinc sulfide having a refractive index of 2.2. Table 5 below sets forth the design thickness of the dielectric layers utilized in each film sample in terms of QWOT at a particular wavelength, and identifies the assessed color change of each film sample.

TABLE 5

| Sample | Dielectric | Refractive Index | QWOT | Wavelength | Assessed Color Change |
|---|---|---|---|---|---|
| 1 | ZnS | 2.2 | 2 | 605 nm | gold to yellow-green |
| 2 | ZnS | 2.2 | 3 | 558 nm | pink to gold |
| 3 | ZnS | 2.2 | 4 | 700 nm | yellow-green to green |
| 4 | ZnS | 2.2 | 4 | 700 nm | pink to green |
| 5 | ZnS | 2.2 | 5 | 685 nm | green to magenta |
| 6 | ZnS | 2.2 | 6 | 663 nm | silver-green to green |

Figure 5:
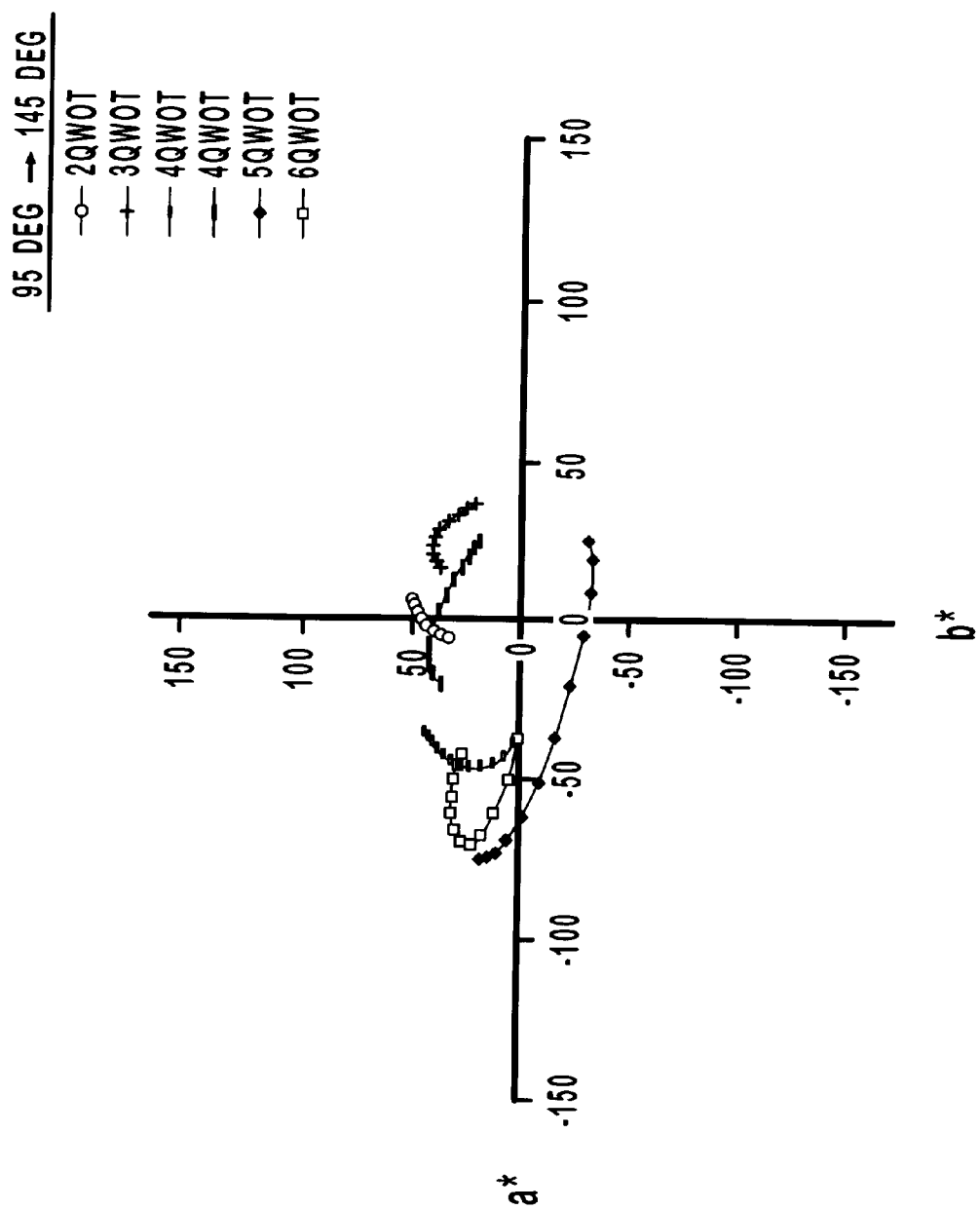
FIG. 5 is a graph of the measured color travel for various color shifting multilayer interference films of the present invention containing zinc sulfide.

The measured color travel for each of film samples 1–6 is plotted in the graph of FIG. 5, in which the vector (arrow) represents the change in chroma and hue as the viewing angle changes from 95 degrees to 145 degrees. As indicated in FIG. 5, significant color shifts are achieved with the five layer designs of Example 5.

Example 6

Various color shifting interference film samples having a five layer design similar to the interference film of Example 1 were fabricated according to the present invention. Each sample contained dielectric layers of zirconium oxide having a refractive index of 2.0. Table 6 below sets forth the design thickness of the dielectric layers utilized in each film sample in terms of QWOT at a particular wavelength, and identifies the assessed color change of each film sample.

TABLE 6

| Sample | Dielectric | Refractive Index | QWOT | Wavelength | Assessed Color Change |
|---|---|---|---|---|---|
| 1 | $ZrO_2$ | 2 | 3 | 535 nm | blue to magenta |
| 2 | $ZrO_2$ | 2 | 4 | 505 nm | blue to purple |
| 3 | $ZrO_2$ | 2.0 | 5 | 495 nm | salmon (pink) to green |
| 4 | $ZrO_2$ | 2.0 | 5 | 548 mn | magenta to gold |
| 5 | $ZrO_2$ | 2.0 | 6 | 518 nm | green to magenta |
| 6 | $ZrO_2$ | 2.0 | 6 | 602 nm | silver to green |
| 7 | $ZrO_2$ | 2.0 | 7 | 550 nm | silver to magenta |
| 8 | $ZrO_2$ | 2.0 | 7 | 603 nm | magenta to silver |

Figure 6:
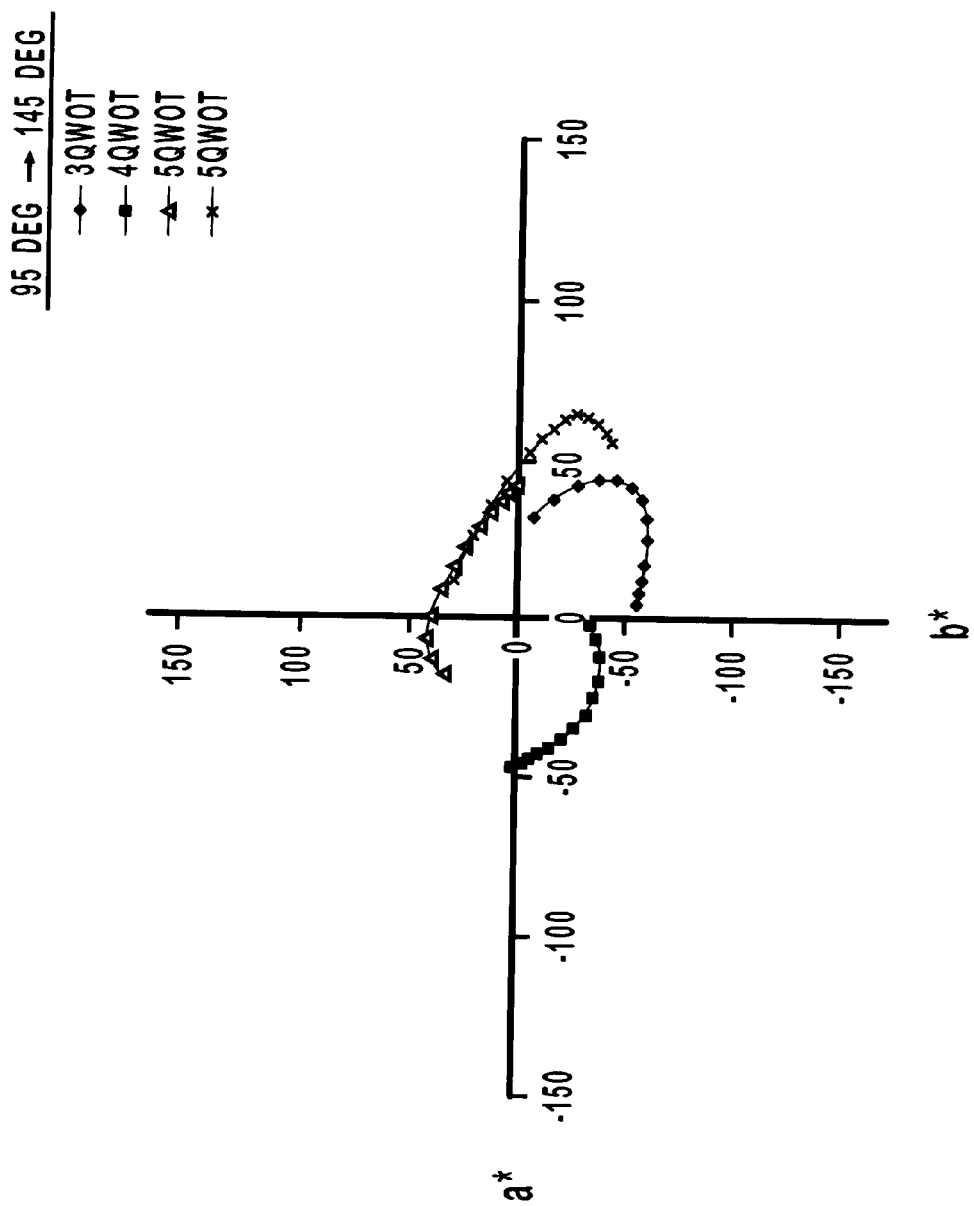
FIG. 6 is a graph of the measured color travel for various color shifting multilayer interference films of the present invention containing zirconium oxide.
Figure 7:
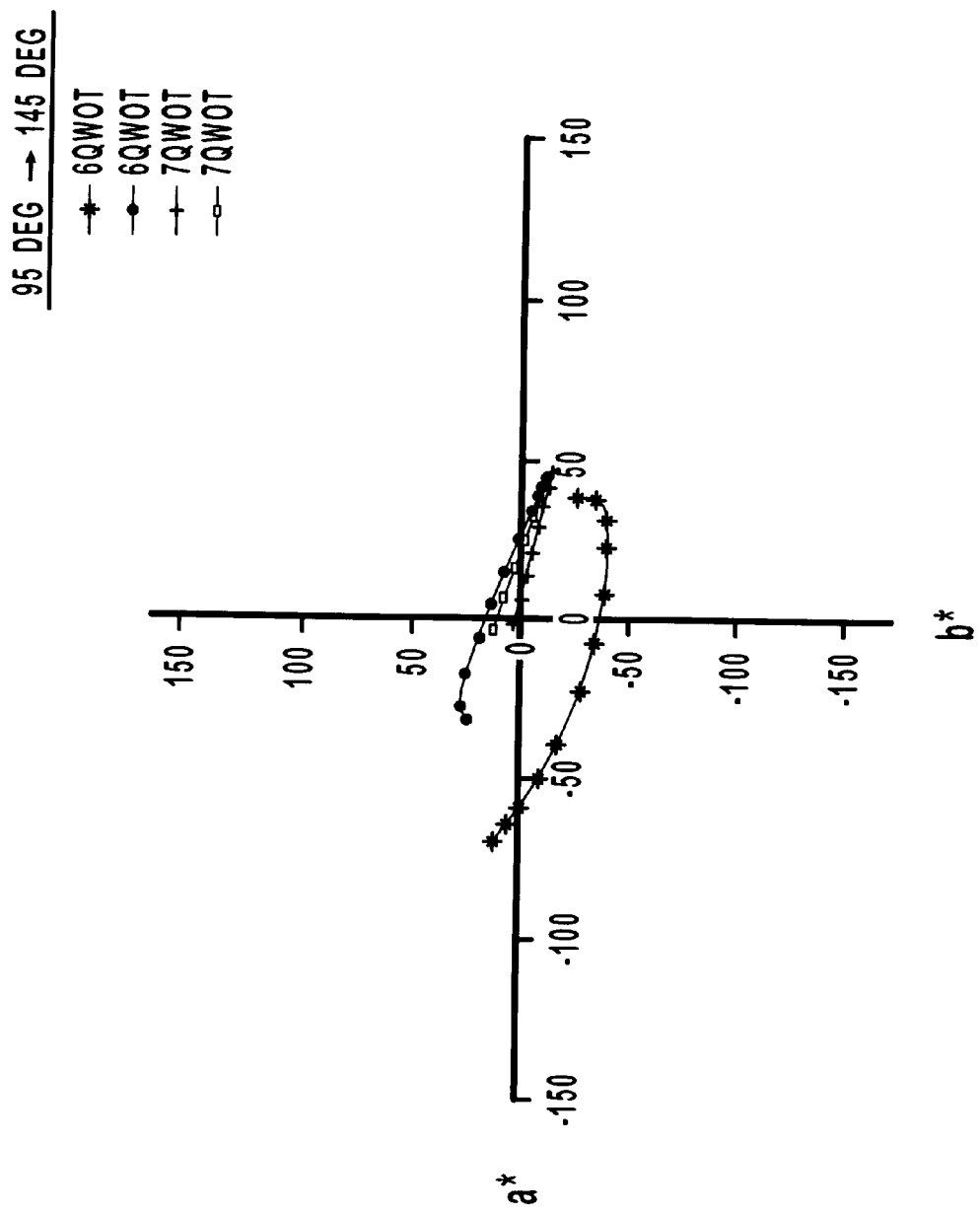
FIG. 7 is a graph of the measured color travel for various color shifting multilayer interference films of the present invention containing zirconium oxide.

The measured color travel for each of film samples 1–4 is plotted in the graph of FIG. 6, while the measured color travel for each of film samples 5–8 is plotted in the graph of FIG. 7. The vector (arrow) in FIGS. 6 and 7 represents the change in chroma and hue as the viewing angle changes from 95 degrees to 145 degrees. As indicated in FIGS. 6 and 7, significant color shifts are achieved with the five layer designs of Example 6.

The present invention may be embodied in other specific forms without departing from its spirit or essential characteristics. The described embodiments are to be considered in all respects only as illustrative and not restrictive. The scope of the invention is, therefore, indicated by the appended claims rather than by the forgoing description. All changes which come within the meaning and range of equivalency of the claims are to be embraced within their scope.

What is claimed and desired to be secured by United States Letters Patent is:

1. A color shifting multilayer interference film, comprising:
    a first absorber layer;
    a dielectric layer on the first absorber layer, the dielectric layer having an index of refraction greater than 1.65; and
    a second absorber layer on the dielectric layer;
    wherein the dielectric layer has an optical thickness at a design wavelength that provides a discrete color shift such that the film has a first color at a first angle of incident light or viewing and a second color different from the first color at a second angle of incident light or viewing.

2. The interference film of claim 1, wherein the first and second absorber layers comprise a material selected from the group consisting of chromium, nickel, palladium, titanium, vanadium, cobalt, iron, tungsten, molybdenum, niobium, ferric oxide, and combinations or alloys thereof.

3. The interference film of claim 1, wherein the first and second absorber layers have a physical thickness of about 50 Å to about 150 Å.

4. The interference film of claim 1, wherein the first and second absorber layers have the same physical thickness.

5. The interference film of claim 1, wherein the dielectric layer comprises a material selected from the group consisting of zinc sulfide, zirconium oxide, tantalum oxide, silicon monoxide, cerium oxide, hafnium oxide, titanium oxide, praseodymium oxide, yttrium oxide, and combinations thereof.

6. The interference film of claim 1, wherein the dielectric layer has an optical thickness in a range from about 2 QWOT at a design wavelength of about 400 nm to about 9 QWOT at a design wavelength of about 700 nm.

7. The interference film of claim 1, wherein the dielectric layer has an index of refraction of about 2 or greater.

8. A symmetrical color shifting multilayer interference film, comprising:
    a first absorber layer;
    a dielectric layer on the first absorber layer, the dielectric layer having an index of refraction greater than 1.65; and
    a second absorber layer on the dielectric layer, the second absorber layer composed of the same material and having the same physical thickness as the first absorber layer;
    wherein the dielectric layer has an optical thickness at a design wavelength that provides a discrete color shift such that the film has a first color at a first angle of incident light or viewing and a second color different from the first color at a second angle of incident light or viewing.

9. The interference film of claim 8, wherein the first and second absorber layers comprise a material selected from the group consisting of chromium, nickel, palladium, titanium, vanadium, cobalt, iron, tungsten, molybdenum, niobium, ferric oxide, and combinations or alloys thereof.

10. The interference film of claim 8, wherein the first and second absorber layers have a physical thickness of about 50 Å to about 150 Å.

11. The interference film of claim 8, wherein the dielectric layer comprises a material selected from the group consisting of zinc sulfide, zirconium oxide, tantalum oxide, silicon monoxide, cerium oxide, hafnium oxide, titanium oxide, praseodymium oxide, yttrium oxide, and combinations thereof.

12. The interference film of claim 8, wherein the dielectric layer has an optical thickness in a range from about 2 QWOT at a design wavelength of about 400 nm to about 9 QWOT at a design wavelength of about 700 nm.

13. The interference film of claim 8, wherein the dielectric layer has an index of refraction of about 2 or greater.

14. A color shifting flake, comprising:
   a first absorber layer;
   a dielectric layer on the first absorber layer, the dielectric layer having an index of refraction greater than 1.65; and
   a second absorber layer on the dielectric layer;
   wherein the dielectric layer has an optical thickness at a design wavelength that provides a discrete color shift such that the flake has a first color at a first angle of incident light or viewing and a second color different from the first color at a second angle of incident light or viewing.

15. The color shifting flake of claim 14, wherein the first and second absorber layers comprise a material selected from the group consisting of chromium, nickel, palladium, titanium, vanadium, cobalt, iron, tungsten, molybdenum, niobium, ferric oxide, and combinations or alloys thereof.

16. The color shifting flake of claim 14, wherein the first and second absorber layers have a physical thickness of about 50 Å to about 150 Å.

17. The color shifting flake of claim 14, wherein the first and second absorber layers have the same physical thickness.

18. The color shifting flake of claim 14, wherein the dielectric layer comprises a material selected from the group consisting of zinc sulfide, zirconium oxide, tantalum oxide, silicon monoxide, cerium oxide, hafnium oxide, titanium oxide, praseodymium oxide, yttrium oxide, and combinations thereof.

19. The color shifting flake of claim 14, wherein the dielectric layer has an optical thickness in a range from about 2 QWOT at a design wavelength of about 400 nm to about 9 QWOT at a design wavelength of about 700 nm.

20. The color shifting flake of claim 14, wherein the dielectric layer has an index of refraction of about 2 or greater.

* * * * *